(12) United States Patent
Chalil et al.

(10) Patent No.: US 11,551,834 B2
(45) Date of Patent: Jan. 10, 2023

(54) CABLE-LAYING DEVICE AND METHOD FOR PRODUCING WIRING HARNESSES

(71) Applicant: LEONI BORDNETZ-SYSTEME GMBH, Kitzingen (DE)

(72) Inventors: Tzeichoun Chalil, Fuerth (DE); Klaus Hold, Remscheid (DE); Paulo Martins, Kitzingen (DE)

(73) Assignee: LEONI Bordnetz-Systeme GmbH, Kitzingen (DE)

( * ) Notice: Subject to any disclaimer, the term of this patent is extended or adjusted under 35 U.S.C. 154(b) by 321 days.

(21) Appl. No.: 16/620,232

(22) PCT Filed: Jun. 8, 2018

(86) PCT No.: PCT/EP2018/065225
§ 371 (c)(1),
(2) Date: Dec. 6, 2019

(87) PCT Pub. No.: WO2018/224676
PCT Pub. Date: Dec. 13, 2018

(65) Prior Publication Data
US 2020/0168369 A1    May 28, 2020

(30) Foreign Application Priority Data
Jun. 9, 2017   (DE) ........................ 10 2017 209 775

(51) Int. Cl.
*H01B 13/012*     (2006.01)
*H01R 43/20*      (2006.01)
(Continued)

(52) U.S. Cl.
CPC ... *H01B 13/01245* (2013.01); *B60R 16/0207* (2013.01); *H01R 43/20* (2013.01);
(Continued)

(58) Field of Classification Search
CPC .......... H01B 13/01245; B60R 16/0207; Y10T 29/53213; Y10T 29/53243; H02K 41/02; H01R 43/20
See application file for complete search history.

(56) References Cited

U.S. PATENT DOCUMENTS

| | | |
|---|---|---|
| 3,769,125 A | 10/1973 | Bethge |
| 3,930,524 A | 1/1976 | Tarbox |

(Continued)

FOREIGN PATENT DOCUMENTS

| | | |
|---|---|---|
| DE | 1679930 A | 3/1972 |
| DE | 2939527 A1 | 4/1980 |

(Continued)

OTHER PUBLICATIONS

Machine Translation of DE 10 2015 119 754, Aug. 2015 (Year: 2021).*

(Continued)

*Primary Examiner* — A. Dexter Tugbang
(74) *Attorney, Agent, or Firm* — Laurence A. Greenberg; Werner H. Sterner; Ralph E. Locher

(57) ABSTRACT

A cable-laying device for producing wiring or cable harnesses of different types includes a laying plane for positioning lines of a wiring or cable harness, a plurality of transport units which can be moved relative to the laying plane in an at least partially automated manner, and a control device which is configured to control the transport units. A method for producing cable harnesses of different types by using a cable laying device is also provided.

20 Claims, 2 Drawing Sheets

(51) Int. Cl.
  *B60R 16/02* (2006.01)
  *H02K 41/02* (2006.01)

(52) U.S. Cl.
  CPC ......... *H02K 41/02* (2013.01); *Y10T 29/53213* (2015.01); *Y10T 29/53243* (2015.01)

(56) References Cited

U.S. PATENT DOCUMENTS

| | | | |
|---|---|---|---|
| 4,454,652 A | 6/1984 | Suzuki et al. | |
| 4,742,612 A | 5/1988 | Dokan et al. | |
| 5,358,016 A | 10/1994 | Emmerich | |
| 6,195,884 B1 * | 3/2001 | Miyamoto | Y10T 29/53243 29/33 F |
| 6,578,256 B2 * | 6/2003 | Takada | Y10T 29/53243 29/751 |
| 8,069,556 B2 | 12/2011 | Selbach | |
| 2006/0290211 A1 * | 12/2006 | Gieskes | H02K 41/03 310/12.04 |

FOREIGN PATENT DOCUMENTS

| | | |
|---|---|---|
| DE | 3523308 A1 | 1/1986 |
| DE | 102007024476 A1 | 11/2008 |
| DE | 102015011822 A1 | 3/2016 |
| DE | 102015119754 A1 | 5/2017 |
| DE | 102016105967 B3 | 9/2017 |
| EP | 0300141 A1 | 1/1989 |
| GB | 2269708 A | 2/1994 |
| JP | 2010103044 A * | 5/2010 |
| WO | 9112708 A1 | 8/1991 |

OTHER PUBLICATIONS

B. Oyegoke, A. Thomas and T. Saha, "The effect of cable terminations on dielectric response measurements," 2007 IEEE International Conference on Solid Dielectrics, 2007, pp. 699-702, doi: 10.1109/ICSD.2007.4290910. (Year: 2007).*

* cited by examiner

CABLE-LAYING DEVICE AND METHOD FOR PRODUCING WIRING HARNESSES

BACKGROUND OF THE INVENTION

Field of the Invention

The invention relates to a cable laying device for producing cable harnesses of different types having a laying plane for positioning lines of a cable harness. The invention further relates to a method for producing cable harnesses of different types by means of a corresponding cable laying device.

Typically, a prefabricated bundle of lines in which a plurality of lines or line elements are combined to form a structural unit having a predefined, branched geometry which is often complex is referred to as a cable harness or cable tree. Such a cable harness is often prefabricated on a so-called cable board or laying board and fitted in a subsequent production method in a device, that is to say, for example, in a motor vehicle.

A corresponding cable board is consequently a type of auxiliary production means for producing cable harnesses and is typically formed by a plate-like member, in particular a type of table panel, which is based on a retention member, for example, a frame, and to which a plurality of retention elements or fixing elements are fitted. In this case, these retention elements are generally securely screwed to the plate-like member and are used to specify a geometry or a layout for a cable harness which is intended to be produced. In this instance, during the production of a corresponding cable harness the individual lines are deposited virtually on the plate-like member, positioned along the retention elements and fixed by means of the retention elements in the provided arrangement. The laying of the lines is generally carried out manually in accordance with an individual laying plan. An automatic laying is possible only with difficulty, on the one hand, as a result of the flexurally slack components or subassemblies, such as, for example, lines, and, on the other hand, as a result of the large variety of variants resulting from individual equipment variants at least in cable harnesses for motor vehicles.

On this basis, an object of the invention is to provide an advantageously configured cable laying device for producing cable harnesses of different types and an advantageous method for producing cable harnesses of different types by means of a corresponding cable laying device.

SUMMARY OF THE INVENTION

This object is achieved according to the invention by a cable laying device for producing cable harnesses of different types having a laying plane for positioning lines of a cable harness, a plurality of transport units which can be displaced in an at least partially automated manner relative to the laying plane and a control device which is configured to control the transport units. The object of the invention is also achieved by a method for producing cable harnesses of different types by using a cable laying device, in particular a cable laying device according to the invention, wherein the cable laying device has a laying plane for positioning lines of a cable harness, a plurality of transport units and a control device which is configured to control the transport units, in which a plurality of transport units are displaced in a manner controlled by the control device in an at least partially automated manner. Preferred developments are contained in the related claims. The advantages and preferred embodiments set out with regard to the cable laying device are accordingly also transferable to the method and vice versa.

In this case, a corresponding cable laying device is configured for producing or manufacturing cable harnesses of different types and in particular cable harnesses for the automotive sector. It is further typically configured in the manner of a so-called cable board or laying board and has a laying plane for positioning lines of a cable harness.

In this case, such a cable harness generally has a large number of different lines. The corresponding lines are, for example, individual strands and/or sheathed cables and/or other line elements, for example, prefabricated lines with a contact element or plug type connector fitted at the end. However, the term "line" further stands below for all conceivable components or subassemblies of a cable harness. The lines are combined in this case in the cable harness to form a common structural unit with predetermined, branched geometry, also called a layout or laying structure. In this case, the predetermined geometry advantageously corresponds at least approximately to the form or shape which the corresponding cable harness has in the fitted state, that is to say, after installation in a device which is provided therefor, such as, for example, a motor vehicle. The term "a branched or ramified structure" is intended to be understood in this instance to mean that line strands or individual lines branch off from a main strand at different positions of the cable harness. In other words, a corresponding cable harness has a structure similar to a tree.

The cable laying device which is configured for producing such cable harnesses has a laying plane for positioning lines of a cable harness and typically a plurality of retention elements which are positioned in the region of the laying plane and which are used for temporary and particularly point-like fixing of lines of a cable harness and which are configured accordingly therefor. In this case, during the production of a corresponding cable harness, the individual lines are generally gradually deposited virtually on the cable laying device which usually has a plate-like base member, positioned in the laying plane and along the retention elements and fixed by means of the retention elements in the provided arrangement, at least for the time in which the cable harness is produced.

In this case, the laying plane in the sense of this application is not typically a strictly mathematical plane, but instead defines a spatial region within which the lines of the cable harness are arranged gradually during the production of a cable harness and typically are also fixed, at least until the completion of a corresponding cable harness. This spatial region can in this case, for example, have a height, size or thickness of a plurality of centimeters, for example, up to 20 cm. The laying plane is typically located in this instance above a surface or upper side of a base member of the cable laying device, in particular a few centimeters, for example, approximately 5 cm or approximately 10 cm, above the surface or upper side. That base member is typically a type of plate, for example, comprising wood, metal or a plastics material, wherein the surface or upper side is flat or planar depending on the intended application or instead has curves. The laying plane is generally a plane which is offset parallel with the surface and which has the same geometry as or a similar geometry to the surface or upper side. This also means that the individual lines or elements of the cable harness during the production of a cable harness are not generally laid on the surface or upper side of the base member but instead in the laying plane which is thereabove, whereby a type of free space remains between the surface or upper side of the base member and the laying plane above.

Furthermore, the cable laying device has a number of transport units which can be displaced in an at least partially automated manner and in particularly fully automated manner along the cable laying device and relative to the laying plane, that is to say, in particular along the laying plane and/or parallel with the laying plane. In this case, the transport units are typically arranged and/or displaceable in the above-mentioned free space. This means that they are arranged and/or are displaced in the case of use in the intermediate space or in the intermediate space layer between the surface or upper side of the base member and the laying plane. Consequently, a first side of each transport unit faces the surface or upper side of the base member and a second side which is opposite the first side faces the laying plane. To this end, each transport unit preferably has an individual drive element for individually driving the transport unit.

Furthermore, the number of transport units of a cable laying device depends on the respective intended application, wherein a plurality of transport units are conventional. In most application cases, the number is preferably greater than or equal to 5, more preferably greater than or equal to 10 and in some cases greater than or equal to 15.

Furthermore, a control device is part of the cable laying device, which is configured to control the transport units. In this instance, this control device is preferably configured as a central control device and in this case all the transport units can then be controlled by the central control device. Alternatively, each transport unit has an individual control unit, wherein in such a case the control units or transport units advantageously communicate with each other in order to prevent collisions or other undesirable states. In such a case, the transport units then act similarly to self-driving motor vehicles/trucks or self-driving trains, wherein the base member virtually specifies the road network or the rail network.

By means of a cable laying device which is configured in this manner, the production of cable harnesses can be simplified. In this case, at the same time two solution approaches, by means of which two different disadvantages of conventional cable boards are overcome, are pursued with such a cable laying device.

Thus, one disadvantage involves conventional cable boards being configured for a single type of cable harness so that for each type of cable harness an individual conventional cable board has to be provided. The different conventional cable boards differ in this case substantially with regard to the number of relative positions and the configuration of the retention elements or the fixing elements which are used to position and fix the lines of a cable harness during the production thereof. This disadvantage is no longer present in a cable laying device which is set out herein depending on the construction variant because a preconfigurable or configurable cable laying device or a configurable cable board can be produced by means of the above-described transport units and accordingly the cable laying device is constructed as such a preconfigurable or configurable cable board depending on the intended application.

In this case, at least one of the transport units then carries a fixing element for fixing at least one line and preferably a plurality of transport units or all the transport units each carry a retention element or fixing element for fixing at least one line. In this case, the corresponding retention elements or fixing elements are connected to the transport units either non-releasably or in a reversibly releasable manner, that is to say, for example, screwed on the transport units. Advantageously, the retention elements or fixing elements are fixed in this case to the sides of the transport units which face away from the surface or upper side of the base member and face the laying plane.

By means of the retention elements or the fixing elements which are carried by the transport units, as indicated above, the layout or the geometry for a type of cable harness which is intended to be produced is then predetermined, typically by the transport units and consequently the retention elements or fixing elements being displaced and thereby positioned at fixing positions. These fixing positions typically represent clearly defined points in the geometry of the type of cable harness which is intended to be produced, that is to say, for example, end points, in particular of branches of the cable harness, or redirecting points or inflexion points. Such a representation of the geometry of a type of cable harness by fixing positions is in principle also brought about in conventional cable boards, but the fixing positions are typically not variable in conventional cable boards. The number of fixing positions and/or the relative arrangement of the fixing positions relative to each other is/are then characteristic of a type of cable harness. In accordance with a similar principle, during painting by numbers a number of points are predetermined, wherein an image can be seen by joining the dots.

Therefore, these fixing positions vary depending on the type of cable harness and therefore the retention elements or fixing elements are displaced by means of the transport units between various predetermined positions during a configuration or pre-configuration of the cable laying device depending on which type of cable harness is intended to be produced currently. This means that the positions of the retention elements or fixing elements can be predetermined in a variable manner by the transport units and that the cable laying device is configured in this manner depending on which type of cable harness is intended to be produced currently. This solution approach therefore results in particular in a cable laying device which can be preconfigured or configured automatically and which is described in greater detail below and a method for producing cable harnesses by means of such a cable laying device. In this instance, it should be made clear that a previously described pre-configuration of the cable laying device for a type of cable harness, in which the transport units and consequently the retention elements or fixing elements are displaced and are thereby positioned at fixing positions, is carried out before the beginning of the assembly of a cable harness of the corresponding type by joining individual members, such as lines, that is to say, before lines are begun to be laid, used and/or positioned or fixed at the retention elements or fixing elements. Accordingly, the transport units in particular do not carry any lines in this case. The transport units which are used for this with the retention elements or fixing elements thereof then all typically remain in their positions, that is to say, the fixing positions at least until a cable harness is finished to such an extent that it is removed as a subassembly from the cable laying device.

In this case, typically different retention elements or fixing elements are used as retention elements or fixing elements, that is to say, for example, one type of fixing element for redirecting points and one type of fixing element for end points. Alternatively, all the retention elements or fixing elements are constructed identically.

Depending on the intended application, a corresponding fixing element or retention element has in this case, for example, as an auxiliary laying means, a pin-like element, a hook-like element, a type of redirecting roller, a retention or gripping element, that is to say, for example, a type of set of pincers, or a plug type element, that is to say, for example, a type of socket for one or more plug type connector(s) or plug(s).

The second solution approach which is pursued by means of the cable laying device set out herein is based on recognition that the production of cable harnesses cannot be readily automated by means of a conventional cable board and that accordingly most working steps have to be carried out manually. By means of the transport units, however, at least individual working steps can be partially automated or automated. To this end, at least one of the transport units is then preferably supplemented by a retention element or fixing element, wherein the retention element or fixing element is preferably constructed as a gripping element, that is to say, for example, as a type of set of pincers. Such a transport unit with a gripping element can be used, for example, to insert, draw in or interlace a line, in particular from an edge region of the cable laying device, by displacing the transport unit virtually into the laying plane or a plane which is parallel therewith, and finally thereby to position and where applicable fix it in the laying plane. This means that, for example, one end of a line is gripped by the gripping element and that the transport unit subsequently moves with this end relative to the laying plane and in this manner forms the line and/or arranges it and brings it into position. In this case, the transport unit advantageously successively travels a plurality of fixing positions and moves in particular along a path along which a branch or a branch portion of a finished cable harness extends. If the previous comparison is again used, it is virtually as if a plurality of predetermined points are connected to each other during painting by numbers. This solution approach consequently results in particular in a method for producing cable harnesses, wherein lines are positioned in a partially or completely automated manner, and a cable laying device which is configured for this.

In this case, the two solution approaches can be carried out both individually and together and depending on the intended application the two solution approaches are implemented individually or together and advantageously by a correspondingly constructed and/or configured control device.

Regardless of which of the two solution approaches or which of the two methods is intended to be carried out, or whether the two solution approaches are carried out, the control device is preferably configured in such a manner that during the execution of a control program at least one transport unit is moved at least in a partially automated manner from a predetermined start position to a predetermined end position, and in particular a plurality of transport units are moved successively and/or simultaneously during the execution of the control program in an automated manner from a predetermined start position to a predetermined end position. A corresponding control program is in this case advantageously automatically carried out after a start or an activation by an operator or user of the cable laying device, wherein the control program is advantageously stored in the control device for this purpose. In this case, in a further preferred manner a plurality of different control programs, from which an operator or user of the cable laying device can select, are stored in the control device. The selection and/or activation of a control program is carried out in this case, for example, via an operating field which is part of the control device.

In a further preferred manner, a specific control program is stored in this case for each type of cable harness in the control device, wherein in this case in particular the predetermined end position of the at least one transport unit and in particular a plurality of predetermined end positions of a plurality of transport units vary/varies from control program to control program. The end positions then advantageously correspond to the fixing positions of the corresponding type of cable harness. Such a control program is then used to configure the cable laying device for a type of cable harness which is intended to be produced subsequently. With such a specific control program, therefore, in particular a specific arrangement of a plurality of transport units which each carry a fixing element is then carried out, wherein this arrangement is used subsequently for producing cable harnesses or at least one cable harness of one type. The corresponding arrangement of the transport units with the fixing elements is subsequently retained until another type of cable harness is intended to be produced and accordingly another specific control program is activated.

It is further advantageous if the predetermined start position of at least one of the transport units is located in the edge region of the laying plane and in particular in the edge region of the cable laying device. In this case, the start position then corresponds in a further preferable manner to a type of rest position or initial position, in which the corresponding transport unit is in the initial state. In this rest position or initial position, the corresponding transport unit further preferably returns during the execution of a reset program, that is to say, after the start or activation of a reset program. Since this rest position or initial position is in the edge region of the laying plane and in particular in the edge region of the cable laying device, this position is typically readily accessible for an operator or user of the cable laying device so that the transport unit here can be equipped, for example, with a fixing element. Alternatively, the fixing element which carries the transport unit can in this case be exchanged or, for example, a line can be fixed to the fixing element, particularly in order to subsequently insert it by moving the transport unit into the laying plane or a plane parallel therewith.

In an advantageous development, the start positions of a plurality of transport units and in particular all of the transport units are located in the edge region, that is to say, typically in the same edge region, of the laying plane and in particular in the edge region of the cable laying device.

It is further favorable if the control device is configured in such a manner that during the execution of a control program, that is to say, after starting or activating a corresponding control program, at least one of the transport units is displaced along a predetermined path from a predetermined start position to a predetermined end position. In this case, in a further preferable manner at least a portion of the path, that is to say, a partial section of the path, corresponds as a close approximation to a portion of a provided laying path, that is to say, a partial section of a provided laying path, or the complete provided laying path, of a line of a cable harness. In this case, the transport unit advantageously travels successively a plurality of fixing positions and moves in particular along a path, along which a branch or a branch portion of a finished cable harness extends or which has at least the same extent. Such a control program then serves in particular to partially automate or completely automate the positioning of lines of a cable harness, that is to say, the insertion of lines into the laying plane or a plane parallel therewith during the production of a cable harness.

In a further preferable manner, control programs of the type described above can also be stored subsequently in the control device, wherein the control device can be programmed particularly to this end.

Furthermore, the control device and/or each control device of each transport unit advantageously has a position identification device, by means of which the positions of the transport units can be detected, identified or determined so that on the basis of the corresponding data a control of the transport units can be and is carried out. In this instance, a corresponding position identification device has, for example, a sensor unit which is configured as an optical sensor or which is based on induction loop technology, NFC technology, RFID technology or laser technology.

It is further advantageous for the transport units to be force-guided. A corresponding force guiding can be produced in this case, for example, by means of a guiding grid, along which the transport units can be displaced. The guiding grid is constructed, for example, as a mechanical rail system. Alternatively, the transport units can be displaced, for example, by means of a magnetic or electromagnetic system, that is to say, for example, in accordance with the principle of a magnetic levitation train. Furthermore, the guiding grid is preferably integrated in a plate-like base member of the cable laying device or arranged in a recessed manner in a plate-like base member.

This base member or the cable laying device in general is preferably orientated at least substantially horizontally or precisely horizontally. The term "substantially horizontally" is intended to be understood to be an inclination with respect to the horizontal, for example, through up to a maximum of 45° or up to a maximum of 30°.

Alternatively, the transport units can be substantially freely displaced relative to the laying plane and in particular along the laying plane and to this end have, for example, wheels for rolling over the upper side or surface of the base member or are configured in the manner of sliding or suspended units which can be displaced substantially freely on the cable laying device and in particular over the upper side or surface of the base member, for example, on the basis of air cushion technology, and are preferably configured as magnetic levitation cushions.

In an advantageous embodiment, an electromagnetic drive system which is constructed for producing magnetic fields which are propagated along the cable laying device and for magnetically driving the transport units is constructed for displacing the transport units. To this end, the drive system comprises a large number of controllable electromagnets which are arranged in particular on the cable laying device, in particular are integrated in the base member. In a corresponding manner, the transport units have magnets, in particular permanent magnets. In order to produce the travelling or propagating magnetic fields, the electromagnets successively have their poles changed by being suitably controlled along a desired travel path so that a magnetic drive force is applied to a respective transport unit along the desired travel path. The control is brought about by the control device. Generally, a substantially free, individual and independent displacement of the individual transport units, for example, in the manner of magnetic levitation cushions or a magnetic levitation train is thereby enabled. In this case, the electromagnets are arranged in particular in a state distributed in a grid. The transport units are preferably not further guided (mechanically) in addition to the magnetic guiding.

According to an additional construction variant, the transport units can in this case be displaced in a transport plane which is arranged in a manner offset relative to the laying plane, in particular parallel therewith. In this case, this transport plane is preferably located in the above-described free space between the laying plane and the upper side or surface of the base member. This construction variant is particularly advantageous when, by means of the transport units or at least by means of one transport unit, lines are intended to be laid or inserted. In this case, initially a positioning and orientation of a line by means of the transport unit in the transport plane is then preferably carried out and subsequently this line is then moved with this orientation, that is to say, while retaining the predetermined form or the predetermined extent, into the laying plane or placed or deposited and fixed in the laying plane. In this case, the transport plane or rather the transport layer is further preferably arranged between the surface of a plate-like base member of the cable laying device and the laying plane.

Furthermore, the cable laying device has in some cases a test device, which is in particular part of the control device. That test device then typically has test connections or inspection connections for at least one line of the cable harness and in particular all the lines of the cable harness, by means of which, for example, a functional test or on-board network test can be carried out. A corresponding functional test or on-board network test is in this case typically carried out at the end of the production of a cable harness, that is to say, before it is then removed from the cable laying device and finally installed in a device provided therefor. In accordance with a construction variant, the test device or a part of the test device is in this case arranged on a transport unit or parts of the test device are arranged on a plurality of transport units so that they can be displaced by means of the transport unit or transport units. In this case, in particular test connections or inspection connections are arranged on transport units which are displaced in the context of the configuration of the cable laying device to positions which are specific to the type of cable harness.

BRIEF DESCRIPTION OF THE SEVERAL VIEWS OF THE DRAWING

Embodiments of the invention are explained in greater detail below with reference to schematic drawings. In the drawings.

DESCRIPTION OF THE INVENTION

Figure 1:
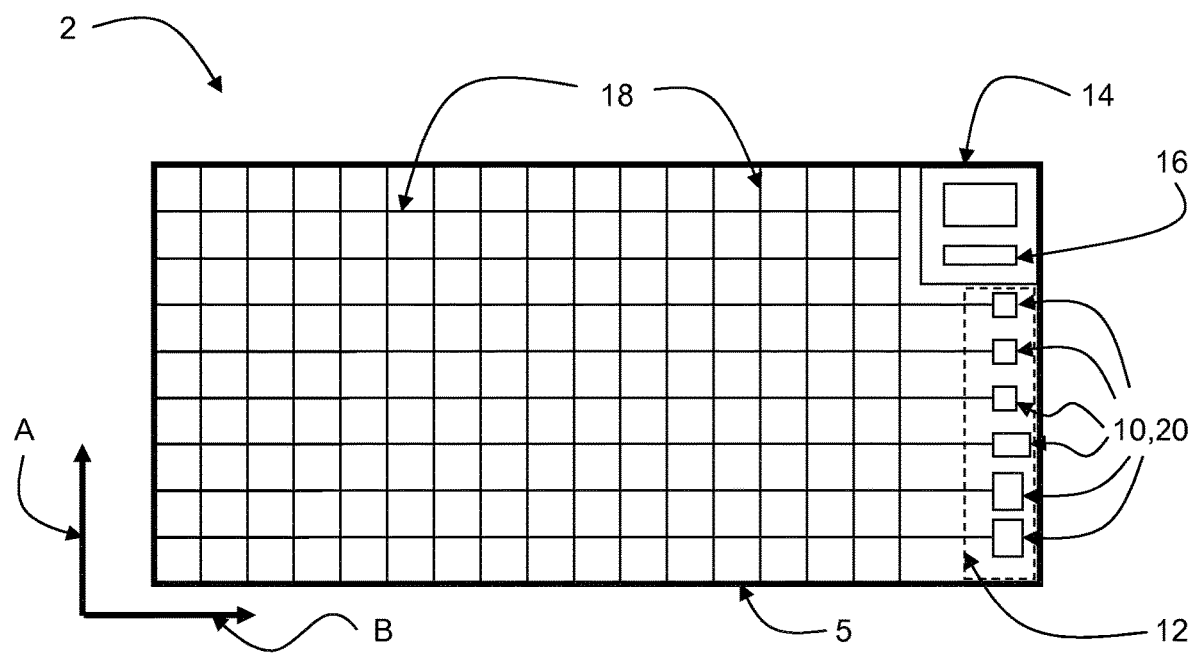
FIG. 1 is a plan view of a cable board having transport units in an edge region.

Mutually corresponding components are each indicated with the same reference numerals in all the Figures.

A cable laying device which is described below by way of example and which is schematically illustrated in FIG. 1 is constructed in the manner of a cable board 2 and configured for the production of cable harnesses 4 of different types, and is accordingly also used therefor. In this case, the cable harnesses 4 are prefabricated by means of the cable board 2, also referred to as the laying board, and then fitted in a device, for example, a motor vehicle, in the context of a production process for a device.

In this instance, the cable board 2 has a plate-like or board-like base member 5 which is based on a frame which is not illustrated in greater detail and the surface or upper side of which is orientated substantially horizontally or in a manner slightly inclined relative thereto. There is located in a region above this surface or upper side a laying plane 6, in which during the production of a cable harness 4 lines 8 of the cable harness 4 are positioned and typically fixed for the subsequent production. In this case, generally individual lines 8 are positioned at least partially on the cable board 2 and cable harnesses 4 are accordingly produced on the cable board 2 in a virtually lying state.

Furthermore, the cable board 2 is constructed in the embodiment as an automatically configurable cable board 2 which can be configured, before production of cable harnesses 4 of a type, for the corresponding type and is also configured for the corresponding type. To this end, a plurality of transport units 10 which are arranged in an initial state in an edge region 12 of the cable board 2 are displaced relative to the laying plane 6 in a manner controlled by a control device 14 in a fully automatic manner.

Figure 2:
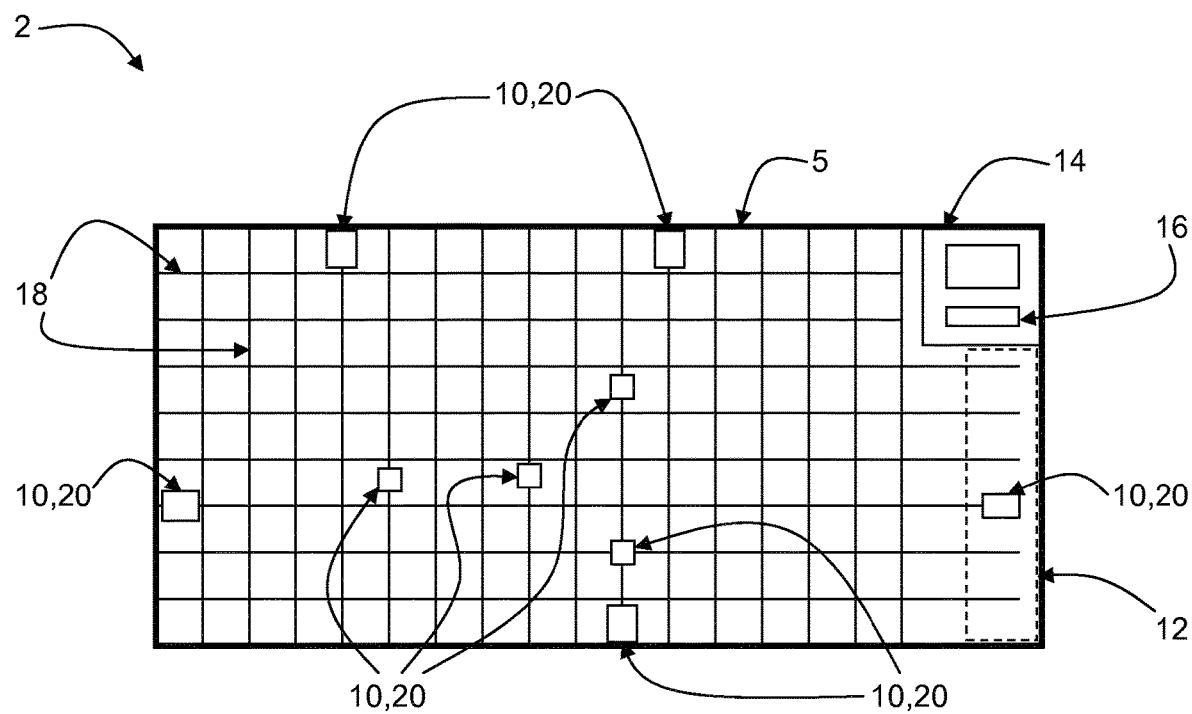
FIG. 2 is a plan view of the cable board having the transport units according to a configuration.

In this case, the control device 14 has an operating field 16 via which a user can select a type of cable harness 4 and can thereby start a program which correlates therewith. In the embodiment, the control device 14 and/or the operating field is integrated directly into the base member 5. Alternatively, these elements are arranged in a control station which is arranged separately from the base member 5. If a corresponding program is started, a predetermined number of transport units 10 are automatically moved from a predetermined start position to a predetermined end position, wherein the predetermined start positions in the initial state are located in the edge region 12 and wherein the number of transport units 10 and the predetermined end positions of the transport units 10 vary from type of cable harness 4 to type of cable harness 4. This means that, for each type of cable harness 4, a number of transport units 10 and corresponding end positions for the transport units 10 are predetermined. If the transport units 10 have then reached the predetermined end positions thereof, the configuration is concluded for the corresponding type of cable harness 4. This situation is indicated in FIG. 2.

In this instance, the end positions correspond to fixing positions and these fixing positions typically represent clearly defined points in the geometry of the type of cable harness 4 which is intended to be produced, that is to say, for example, end points, in particular of branches of the cable harness 4, or redirecting or inflection points. Such a representation of the geometry of a type of cable harness 4 by fixing positions is in principle also carried out in the case of conventional cable boards, but the fixing positions are not typically variable in conventional cable boards.

Furthermore, the cable board 2 is configured in such a manner that the transport units 10 are themselves displaceable in two linearly independent directions A, B, wherein in particular each transport unit 10 can be displaced independently of the remaining transport units 10 and relative to the remaining transport units 10 in the two linearly independent directions A, B. The transport units 10 can consequently be displaced, for example, one after the other, that is to say that the second transport unit 10 is displaced only when the first transport unit 10 has reached its predetermined end position and so on.

In this case, the transport units 10 are preferably displaceable in the embodiment by means of an electromagnetic drive system which is not illustrated in greater detail here. Specifically, the transport units are constructed in the manner of magnetic levitation cushions. To this end, a large number of controllable electromagnets are arranged in the base member 5 for producing a travelling magnetic field and additional magnets, in particular electromagnets, are arranged in the transport units. The transport units 10 can thereby be displaced along a desired displacement path and along the cable board 2. The control of the electromagnets is therefore carried out in accordance with the selected type of cable harness 4.

The transport units 10 are preferably displaceable along a guiding grid 18. That guiding grid 18 is in this case integrated or recessed in the plate-like base member and consequently arranged virtually under the surface. In this instance, the guiding grid 18 is, for example, provided by a grid arrangement of the electromagnets or by intersecting strip conductors or conductor strips.

Figure 3:
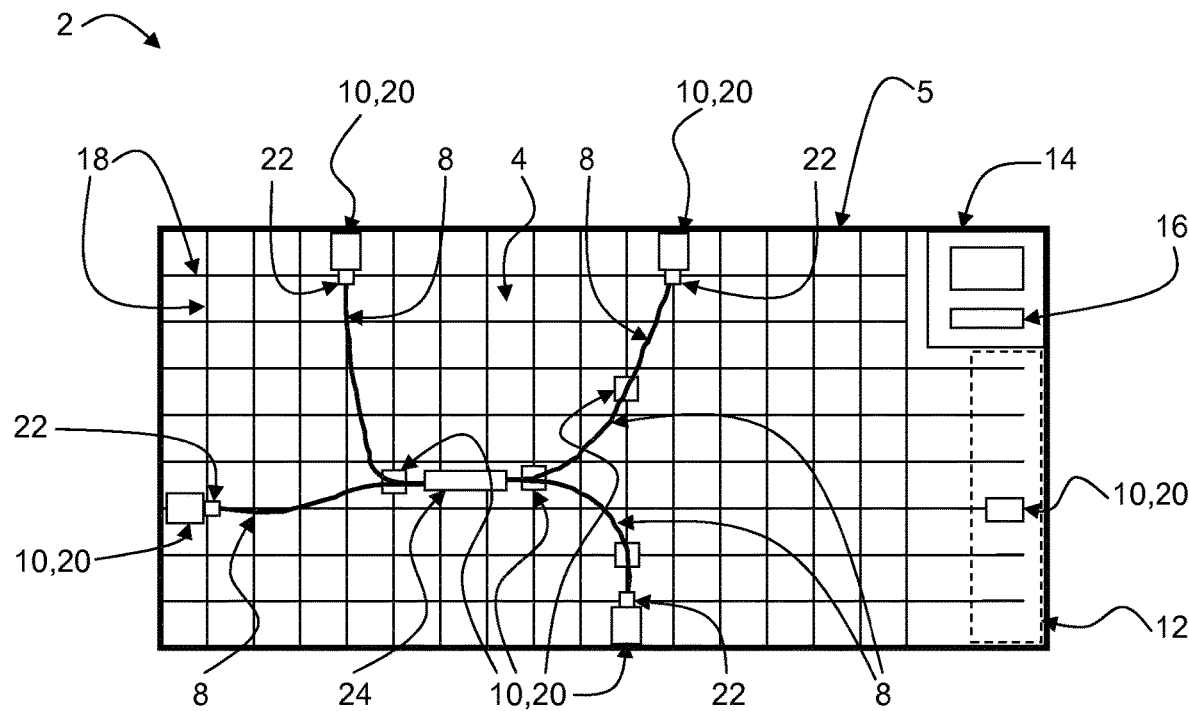
FIG. 3 is a plan view of the cable board having the transport units according to the configuration and a cable harness produced thereon and FIG. 4 is a cut-out of a side view of the cable board according to the configuration and during production of the cable harness.

Each of these transport units 10 which are displaced in the context of the configuration of the cable board 2 further carries a fixing element or a retention element 20 which is constructed, for example, as an auxiliary laying means. In the simplest case, such a retention element 20 is configured in this case as a simple redirecting element, such as, for example, a pin. In this case, the retention elements 20 are used in the context of the production of cable harnesses 4 for the temporary and particularly point-like fixing of lines 8 of the cable harness 4 so that by means of the retention elements 20 a laying geometry can be predetermined for the lines 8 of a cable harness 4. This situation is indicated in FIG. 3.

This illustration shows a partially produced cable harness 4, the lines 8 of which are arranged in a provided laying geometry on the cable board 2 and which are fixed in this state at least in a point-like manner by means of the retention elements 20. In the case of the transport units 10 which are positioned in the central region, the retention elements 20 are in this case configured as simple redirecting elements, whereas the transport units 10 which are positioned on the cable board 2 at the peripheral side carry retention elements 20 which are configured, for example, as mating connectors. According to FIG. 3, plug type connectors 22 which are fitted to the lines 8 at the ends are inserted into these mating connectors. In such a situation, in which at least some lines 8 of the cable harness 4 are arranged in a provided laying geometry, a production step is typically carried out, wherein lines 8 are fixed to each other, for example, by taping 24, as indicated in FIG. 3.

If the production of a cable harness 4 is finally concluded, it is removed from the cable board 2 so that an additional cable harness 4 of the same type can then be produced. If, however, a different type of cable harness 4 is intended to be subsequently produced, a new configuration of the cable board 2 is necessary and can again be initiated by a user starting a corresponding program.

In accordance with an additional embodiment, the transport units 10 are used not only to configure the cable board 2 before the assembly of individual portions in order to produce cable harnesses 4, but additionally also to automatically lay the lines 8 of a cable harness 4 on the cable board 2 during production of a cable harness 4. To this end, at least one transport unit 10 is equipped in the edge region 12 with a line 8. Subsequently, this transport unit 10 is displaced along a predetermined path to a predetermined end position automatically, that is to say, in a manner controlled by the control device 14, wherein the path extends along a portion of a provided laying path or along a provided laying path of one of the lines 8 of the cable harness 4. That is to say that, by means of this transport unit 10, a line 8 is virtually inserted and positioned in accordance with the provided laying geometry in the laying plane 6.

To this end, the corresponding transport unit 10 advantageously has a retention element 20 which is configured, for example, as a mating connector or as a gripping element so that one end of a line 8 can be fixed to the corresponding retention element 20. This end is then carried during displacement of the transport unit 10 and the corresponding line 8 is then thereby inserted and laid. In this manner, a plurality of lines or all of the lines 8 of the cable harness 4 can then be arranged on the cable board 2 automatically so that the laying of the lines 8 is also carried out in a substantially fully automatic manner.

Figure 4:
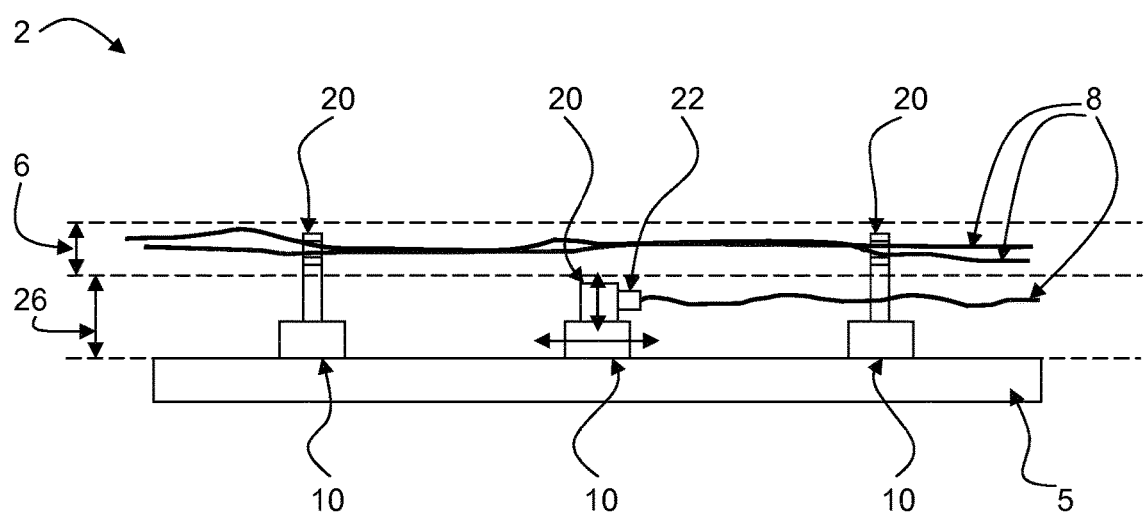

If an at least partially automatic laying of lines 8 is provided for, it is further favorable for the lines 8 to be inserted and arranged in a base plane or transport plane 26 and subsequently to be deposited and fixed in the laying plane 6. In this case, the transport plane 26 is positioned, for example, between the surface of the base member of the cable board 2 and the laying plane 6 and a line 8 is then accordingly placed into the laying plane 6 by parallel displacement away from the surface of the base member and consequently deposited in the laying plane 6. Such a spatial separation of the region, in which the lines 8 are temporarily held, that is to say, the laying plane 5, and the region which is provided for inserting and orientating the lines 8, that is to say, the transport plane 26, is particularly advantageous in this case for cable harnesses 4 with a very large number of lines 8. A corresponding situation is illustrated in FIG. 4.

The invention is not limited to the above-described embodiment. Instead, other variants of the invention can also be derived therefrom by the person skilled in the art without departing from the scope of subject-matter of the invention. Furthermore, all individual features which are described in connection with the embodiment can also in particular be combined with each other in other manners without departing from the scope of subject-matter of the invention.

LIST OF REFERENCE NUMERALS

2 Cable board
4 Cable harness
5 Base member
6 Laying plane
8 Line
10 Transport unit
12 Edge region
14 Control device
16 Operating field
18 Guiding grid
20 Retention element
22 Plug type connector
24 Taping
26 Transport plane
A Direction
B Direction

The invention claimed is:

1. A cable laying device for producing cable harnesses of different types, the cable laying device comprising:
 a cable board having a plate-shape base member, said plate-shape base member having a plane surface extending in two linearly independent directions;
 a laying plane for positioning lines of a cable harness;
 a plurality of transport units to be displaced in an at least partially automated manner relative to said laying plane, said transport units being displaceable in said two linearly independent directions for movement of the transport units to predetermined end positions about the plane surface defined by the plate-shape base member;
 a control device configured to control said transport units; and
 an electromagnetic drive system for displacing said transport units, said electromagnetic drive system being configured to produce magnetic fields traveling along the cable laying device for displacing said transport units, said electromagnetic drive system having multiple controllable electromagnets integrated in the plate-shape base member and additional magnets are arranged in each of the transport units.

2. The cable laying device according to claim 1, wherein: each of said transport units is displaceable independently of other transport units and relative to said other transport units in said two linearly independent directions.

3. The cable laying device according to claim 1, which further comprises:
 a retention element carried by at least one of said transport units for temporarily fixing at least one of the lines, or
 retention elements each being carried by a respective one of said transport units for fixing at least one of the lines.

4. The cable laying device according to claim 1, wherein: said control device is configured to automatically move at least one of said transport units during an execution of a control program from a predetermined start position to a predetermined end position, or
 said control device is configured to automatically move each of said plurality of said transport units during an execution of a control program from a predetermined start position to a predetermined end position.

5. The cable laying device according to claim 4, wherein said control device is configured to carry out a plurality of different control programs, a specific control program is stored for each type of cable harness and said respective predetermined end positions of said transport units vary from control program to control program.

6. The cable laying device according to claim 4, wherein: said predetermined start position of at least one of said transport units is located in an edge region of said laying plane, or
 said predetermined start positions of all of said transport units are located in said edge region of said laying plane.

7. The cable laying device according to claim 4, wherein said control device is configured to displace at least one of said transport units along a predetermined path from a predetermined start position to a predetermined end position during the execution of the control program.

8. The cable laying device according to claim 7, wherein said predetermined path extends along a portion of a provided laying path or along a provided laying path of one of the lines of a cable harness.

9. The cable laying device according to claim 1, wherein said control device has a position identification device for detecting positions of said transport units.

10. The cable laying device according to claim 1, wherein said plate-shape base member further comprises a guiding grid force-guiding said transport units, said guiding grid extending over a whole of said plate-shape base member in both linearly independent directions and having intersecting guiding elements.

11. The cable laying device according to claim 1, wherein said transport units are freely displaceable over the plane surface of the plate-shape base member in both linearly independent directions for distribution over the plate-shape base member independently of each other.

12. The cable laying device according to claim 1, wherein said transport units are displaceable in a transport plane being offset relative to said laying plane or parallel to said laying plane.

13. The cable laying device according to claim 1, which further comprises a test device for carrying out a functional test.

14. A method for producing cable harnesses of different types, the method comprising the following steps:
  providing a cable board having a plate-shape base member, the plate-shape base member having a plane surface extending in two linearly independent directions;
  providing a cable laying device having a laying plane for positioning lines of a cable harness;
  providing a plurality of transport units, the transport units being displaceable in the two linearly independent directions for movement of the transport units to predetermined end positions about the plane surface defined by the plate-shape base member;
  providing a control device configured to control the transport units;
  providing an electromagnetic drive system for displacing the transport units, the electromagnetic drive system being configured to produce magnetic fields traveling along the cable laying device for displacing the transport units, the electromagnetic drive system having multiple controllable electromagnets integrated in the plate-shape base member and additional magnets are arranged in each of the transport units and
using the control device to at least partially automatically control a displacement of the plurality of transport units relative to the laying plane.

15. The method according to claim 14, which further comprises:
  displacing the transport units as a group in two linearly independent directions, or
  displacing each of the transport units independently of other transport units and relative to the other transport units in the two linearly independent directions.

16. The method according to claim 14, which further comprises:
  configuring the cable laying device for a type of cable harness, before an assembly of individual components for producing a corresponding type of cable harness, by using the control device to displace the plurality of transport units from a predetermined start position to a predetermined end position,
  using the predetermined end positions of the transport units to reflect a predetermined geometry of the corresponding type of cable harness, and
  optionally not carrying any line using the transport units.

17. The method according to claim 14, which further comprises:
  during a production of the cable harness, displacing at least one of the transport units along a predetermined path from a predetermined start position to a predetermined end position in order to position a line of the cable harness in the laying plane,
  the predetermined path extending along a portion of a provided laying path or along the provided laying path of the line in a finished cable harness, and
  using the transport unit to carry at least one end of the line.

18. The method according to claim 17, which further comprises placing the predetermined start position in an edge region of the laying plane, and positioning the line of the cable harness in the laying plane after configuring the cable laying device.

19. A cable laying device for producing cable harnesses of different types, the cable laying device comprising:
  a cable board having a plate-shape base member, said plate-shape base member having a plane surface extending in two linearly independent directions;
  a laying plane for positioning lines of a cable harness,
  a plurality of transport units to be displaced in an at least partially automated manner relative to said laying plane, said transport units being displaceable in said two linearly independent directions for movement of the transport units to predetermined end positions about the plane surface defined by the plate-shape base member;
  a control device configured to control said transport units;
  a guiding grid force-guiding said transport units, said guiding grid extending over a whole of said plate-shape base member in both linearly independent directions and having intersecting guiding elements, said guiding grid being constructed as a mechanical rail system with intersecting rails or by a grid arrangement of electromagnets.

20. A method for producing cable harnesses of different types, the method comprising the following steps:
  providing a cable board having a plate-shape base member, the plate-shape base member having a plane surface extending in two linearly independent directions;
  providing a cable laying device having a laying plane for positioning lines of a cable harness;
  providing a plurality of transport units, the transport units being displaceable in the two linearly independent directions for movement of the transport units to predetermined end positions about the plane surface defined by the plate-shape base member;
  providing a control device configured to control the transport units;
  providing a guiding grid force-guiding the transport units, the guiding grid extending over a whole of said plate-shape base member in both linearly independent directions and having intersecting guiding elements, the guiding grid being constructed as a mechanical rail system with intersecting rails or by a grid arrangement of electromagnets; and
using the control device to at least partially automatically control a displacement of the plurality of transport units relative to the laying plane.

* * * * *